(12) United States Patent
Rael

(10) Patent No.: US 7,135,658 B2
(45) Date of Patent: Nov. 14, 2006

(54) MAGNETIC SAFETY FEATURE FOR COOKWARE AND COOKING STOVES

(76) Inventor: Paul J Rael, 1240 India St., #105, San Diego, CA (US) 92101

( * ) Notice: Subject to any disclaimer, the term of this patent is extended or adjusted under 35 U.S.C. 154(b) by 0 days.

(21) Appl. No.: 10/862,979

(22) Filed: Jun. 8, 2004

(65) Prior Publication Data

US 2005/0269314 A1  Dec. 8, 2005

(51) Int. Cl.
*H05B 3/68* (2006.01)

(52) U.S. Cl. ........... 219/446.1; 219/620; 219/447.1; 219/443.1; 219/518; 219/519; 366/147; 366/273; 366/274; 126/24; 126/42; 126/90 A

(58) Field of Classification Search ........... 219/446.1, 219/447.1, 443.1, 455.1, 518, 519, 489, 620; 366/146, 147, 273, 274; 126/24, 42, 90 A, 126/92 A
See application file for complete search history.

(56) References Cited

U.S. PATENT DOCUMENTS

| | | | |
|---|---|---|---|
| 3,796,850 A * | 3/1974 | Morelend et al. ........... 219/622 |
| 3,979,572 A * | 9/1976 | Ito et al. ..................... 219/621 |
| 4,155,343 A | 5/1979 | Hartman | |
| 4,314,543 A | 2/1982 | Bullington et al. | |
| 4,517,955 A | 5/1985 | Ehrlich et al. | |
| 4,836,181 A | 6/1989 | Saga | |
| 4,934,333 A | 6/1990 | Ducate, Jr. et al. | |
| 5,575,445 A | 11/1996 | Kozdas | |
| 5,750,963 A | 5/1998 | Christensen et al. | |
| 6,031,209 A * | 2/2000 | Wiesman ................ 219/447.1 |
| 6,044,834 A | 4/2000 | Zappetti | |
| 6,145,432 A | 11/2000 | Bellue, Jr. | |
| 6,207,933 B1 | 3/2001 | Stedron et al. | |
| 6,255,628 B1 | 7/2001 | Perrino | |
| 6,300,603 B1 * | 10/2001 | Edwards et al. ......... 219/447.1 |
| 6,517,037 B1 | 2/2003 | Munoz | |
| 6,698,420 B1 | 3/2004 | Anthony | |

* cited by examiner

*Primary Examiner*—Shawntina Fuqua
(74) *Attorney, Agent, or Firm*—Vista IP Law Group LLP

(57) ABSTRACT

Methods and devices for securing the bottom of an item of cookware to the burner of a stove top by use of magnetism. The magnet(s) may be permanent magnets or electromagnets. The cookware may comprise a permanent magnet disposed on or in the base of the cookware. The burner comprises a magnetic material such as steel or iron. The magnetic material may be in the grate of the cook top, in the electric coil of an electric burner, in the surface of a vitroceramic or smooth-top stove top, or other component of the cook top in close proximity to the bottom of the cookware when it is on the cooking surface. The magnetic source prevents the cookware from being accidentally knocked off the cook top.

16 Claims, 3 Drawing Sheets

MAGNETIC SAFETY FEATURE FOR COOKWARE AND COOKING STOVES

FIELD OF THE INVENTION

The present invention relates generally to cookware and more particularly to devices for preventing stove top accidents.

BACKGROUND OF THE INVENTION

Cooking stoves, or "ranges" as they are sometimes called, generally comprise a plurality of heating elements, either gas or electric burners, positioned at openings in a generally flat, top surface of the stove. The burners produce heat for heating the contents of a cooking vessel (cookware). Commonly, a grate is positioned over each burner for supporting the cookware over the burner when cooking. The grate usually rests in a depression or opening in the cook top. Many examples of cookware commonly used on a stove consist of a container portion and a handle extending outward from the container. A more recent innovation involves vitroceramic or smooth-top stoves which have burners mounted beneath a substantially flat cooking surface which extends across most, or all, of the cook top.

While cooking stoves are very useful appliances, they also represent a significant danger and are the source of many accidents, including burns and in worst cases, fires. Many of these accidents are caused by the tipping over of cookware on a stove-top causing spilling or splattering of hot contents. If bumped hard enough, the cookware can be knocked completely off the stove top onto the floor. The risk of tip or bumping cookware is exacerbated by the handles which extend out from most cookware used on stoves.

Cookware holding devices for securing cookware on a stove top have been previously described. For example, a stove top pan holding apparatus is described in U.S. Pat. No. 6,517,037, issued Feb. 11, 2003, to Munoz. The pan holder apparatus comprises a fastening means for securing the holder to the stove and a pan holder having a plurality of fastening assemblies for releasably holding the handle of a pan. Several other pan holding devices are described in U.S. Pat. No. 5,574,445, issued Nov. 19, 1996, to Kozdas; U.S. Pat. No. 4,836,181, issued Jun. 6, 1981, to Saga; and U.S. Pat. No. 4,155,343, issued May 22, 1979, to Hartman. Alternative to devices which hold the cookware, guards or shields for preventing children from reaching cookware on a stove top and for blocking splashing, spilling or splattering from the cookware have been described. More specifically, the following patents describe various devices for blocking access to the stove top and for preventing burns from splattering oil, grease, water, food particles, and so on: U.S. Pat. Nos. 4,155,343; 4,314,543; 4,517,955; 4,836,181; and 4,934,333.

These previously known safety devices for preventing stove top accidents are complicated, awkward and inconvenient to use, and interfere with the manipulation of the cookware while cooking.

Accordingly, there is a need for an improved safety device for stove tops which overcomes the deficiencies of previous devices.

SUMMARY OF THE INVENTION

The stove top safety feature of the present invention comprises methods and devices for securing the bottom of an item of cookware to the burner of a stove top by use of magnetism. The magnet(s) may be permanent magnets or electromagnets.

The cookware may comprise a permanent magnet disposed on or in the base of the cookware. The burner comprises a magnetic material such as steel or iron. The magnetic material may be in the grate of the cook top, in the electric coil of an electric burner, in the surface of a smooth-top stove top, or any other component of the cook top which is in close proximity to the bottom of the cookware when it is placed on the cooking surface. When the cookware is placed on the stove top, the magnetic field of the permanent magnet creates a force on the magnetic material tending to bias the cookware against the stove top, thereby securing the cookware to the cook top.

Alternatively, the magnet may be disposed in the cook top of the stove while the cookware comprises a magnetic material in or on its base. The magnet may be a permanent magnet or it may be an electromagnet. If it is an electromagnet, an electric current is applied to create the magnetic field. Again, the magnetic field of the magnet creates a force on the magnetic material in the cookware base biasing the cookware against the stove top.

It should be understood that both the cookware and the cook top may comprise magnets, so long as the polarity of the magnets is configured so that the magnets attract each other rather repel.

DETAILED DESCRIPTION OF THE INVENTION

Figure 1:
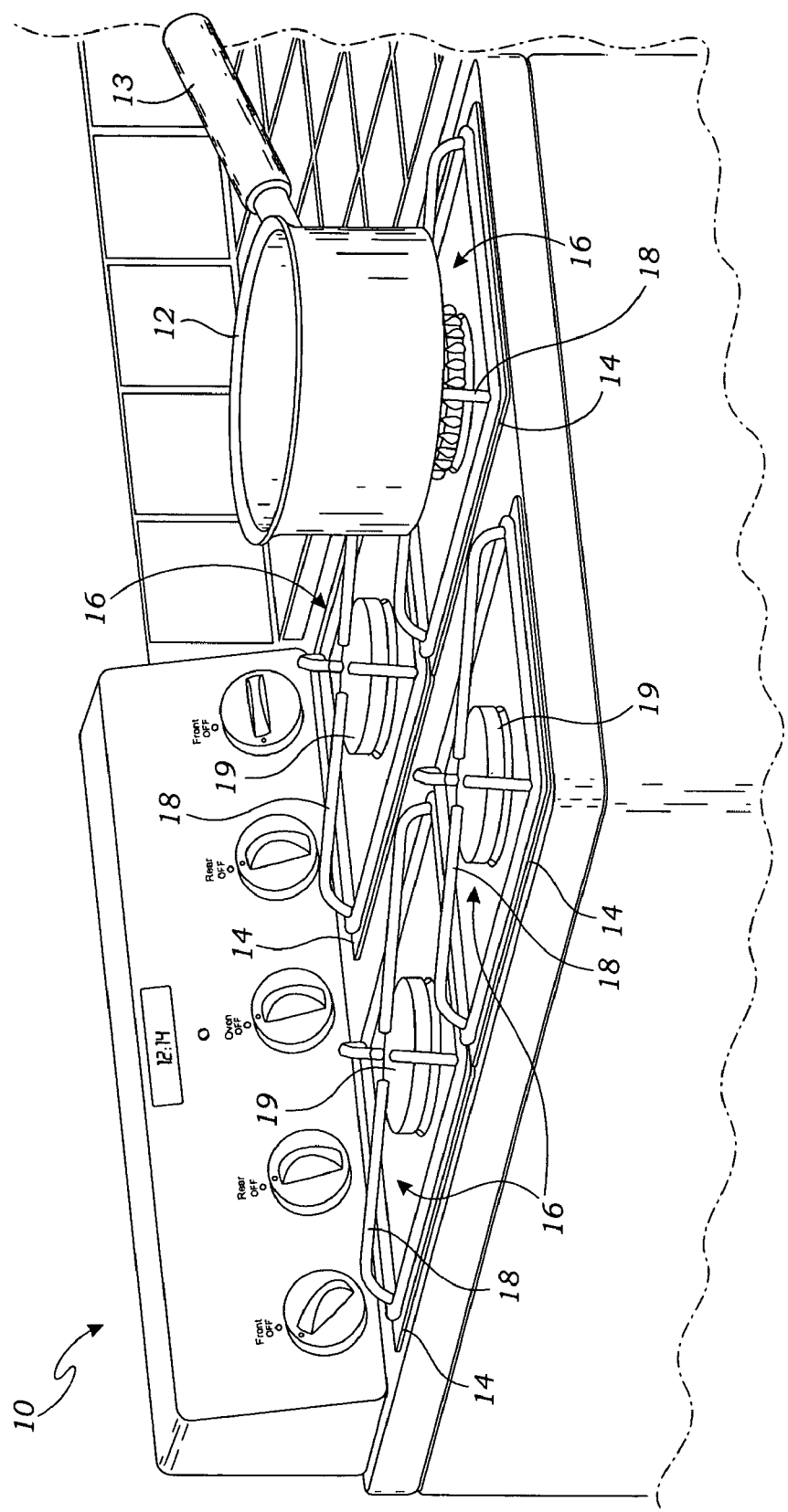
FIG. 1 is a perspective view of a cooking stove and item of cookware according to the present invention.

Turning to FIG. 1, a cooking stove 10 and cooking pot 12 according to the present invention are shown. It is understood that the cooking pot 12 may be any type of cooking vessel including a pot, pan, bowl, each with or without one or more handles 13. The cooking stove 10 comprises a cook top 14 and a plurality of heating stations 16 each positioned at an opening in the cook top 14. Each heating station 16 has a heating element 19 covered by a grate 18.

Figure 2:
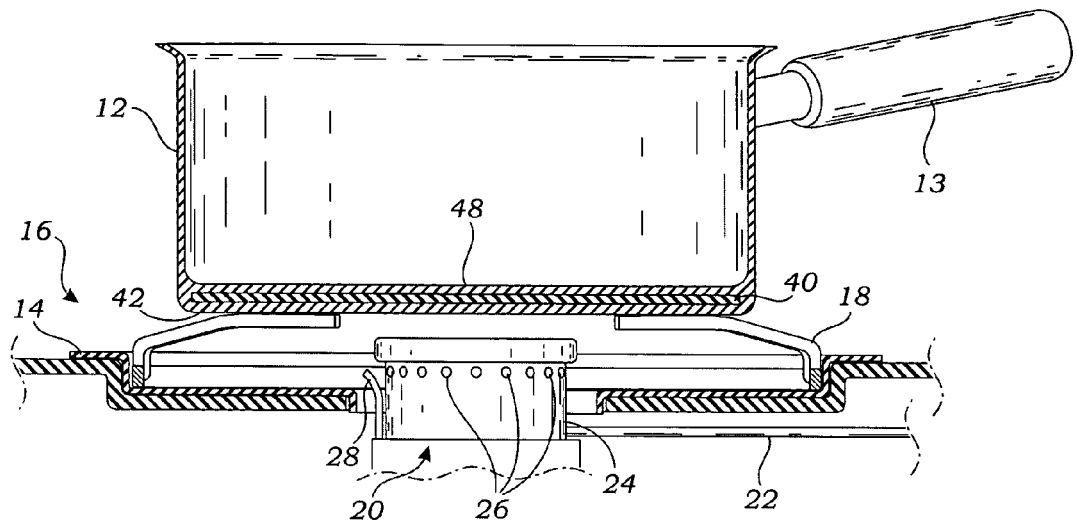
FIG. 2 is an enlarged partial cross-sectional view of one of the heating stations of the cooking stove of FIG. 1 for a gas stove.

The heating elements 19 of the cooking stove 10 may be gas burners, electric burners or other suitable heat source now known or developed in the future. FIG. 2 shows an enlarged partial cross-sectional view of one of the heating stations 16 for a stove 10 having gas burners. The heating element 19 comprises a gas burner assembly 20. The gas burner assembly 20 includes a gas line 22 connected to a burner 24 having a plurality of orifices 26. The gas burner also has a starter 28 which may be a pilot light, flint or other source of spark or heat for lighting the gas burner 20.

Figure 3:
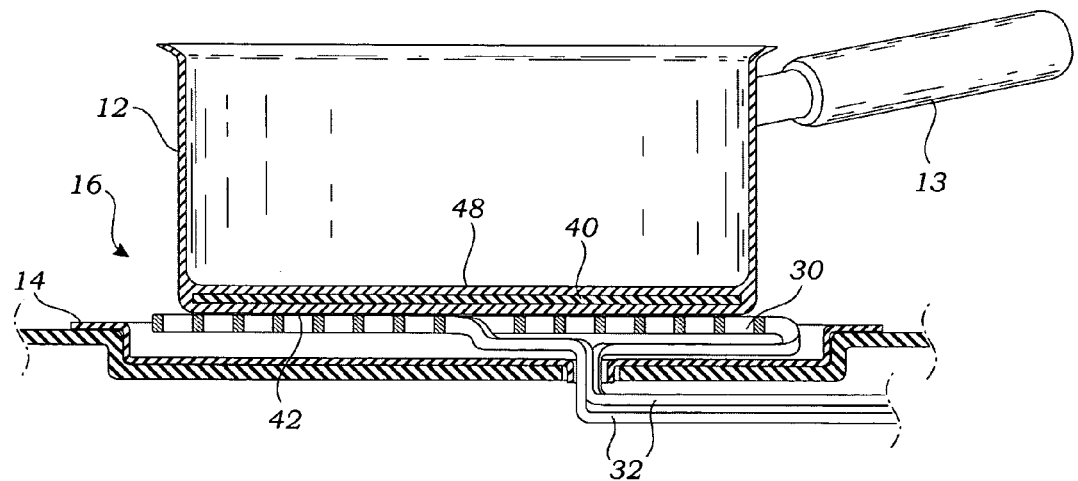
FIG. 3 is an enlarged partial cross-sectional view of one of the heating stations of the cooking stove of FIG. 1 for an electric stove.
Figure 4:
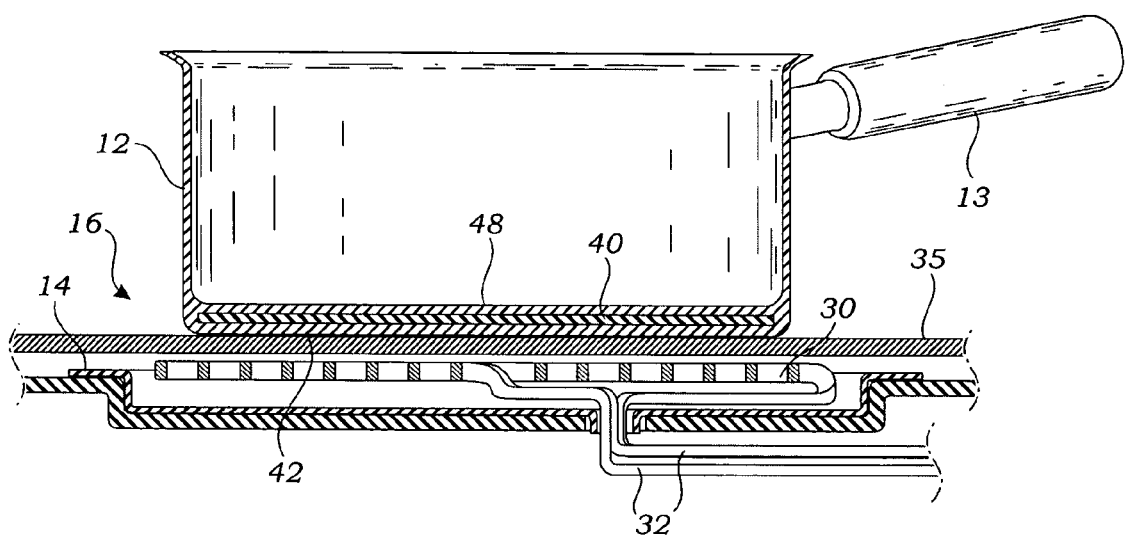
FIG. 4 is an enlarged partial cross-sectional view of one of the heating stations of the cooking stove of FIG. 1 for an electric stove having a smooth top cook top.

FIG. 3 shows an enlarged partial cross-sectional view of one of the heating stations 16 for a stove 10 having electric burners. The heating element 19 comprises an electric heating coil 30. The electric heating coil 30 is connected to electrical leads 32 which are in turn connected to a source of electric power such as an electrical wall outlet. In use, the cooking pot 12 may be placed directly on the heating coil 30 or the heating coil may be covered by a protective cover or grate 34 or even a smooth-top cook top 35 as shown in FIG. 4.

In order to secure the cooking pot 12 to the heating station 16 to prevent the pot 12 from tipping or sliding, the cooking pot 12, the heating station 16, or both, are provided with a magnetic field source 40. The magnetic field source 40 may be one or more permanent magnets or electromagnets. In the case where only one of the cooking pot 12 or the heating station 16 is provided with a magnetic field source 40, the other feature is provided with a magnetizable element 42. The magnetizable element 42 is made of a magnetic material such that in the presence of a magnetic field the magnetic material is magnetized creating a force tending to pull the magnetizable element 42 toward the magnetic field source 40. In the case where both the cooking pot 12 and the heating station 16 are provided with a magnetic field source 40, the polarity of the magnetic field sources 40 must be configured so that they attract each other rather than repel, i.e. the north pole of one of the field sources 40 must be positioned toward the south pole of the other field source 40.

FIG. 2 illustrates a magnetic safety feature according to the present invention in which the cooking pot 12 is provided with a magnetic field source 40 and the heating station comprises a magnetic material. The base 42 of the cooking pot 12 has a multi-layer construction with the magnetic field source 40 encapsulated between the bottom surface 46 of the base 42 and the inside bottom 48 of the pot 12. The cooking pot 12 may be constructed of stainless steel, glass, tempered glass, aluminum or any other suitable material. The grate 18 is made of a magnetizable material such as steel or iron. When the cooking pot 12 is placed onto the grate 18, the magnetic field of the magnetic field source 40 creates a force on the magnetizable material of the grate 18 tending to pull the pot 12 against the grate 18, thereby securing the pot 18 to the cook top 14. The force holding the pot 12 to the grate 18 helps prevent the pot 12 from sliding or tipping if the pot 12 or its handle 13 is inadvertently bumped. Alternatively, the grate 18 could be made with or provided with a magnetic field source 40, and the base 42 of the cooking pot 12 could be provided with or made from a magnetizable material.

Referring again to FIGS. 3 and 4, a magnetic safety feature of the present invention will be described for a cooking stove 10 having electric burners. The cooking pot 12 is identical to the cooking pot 12 described in the previous paragraph. The heating coil 30, the protective cover or grate 34 and/or the smooth-top cook top 35 are made of, or are provided with, a magnetizable material. For example, the smooth top cook top 35 may be a multi-layer construction in which the areas around each heating station 16 are provided with a layer of magnetizable material 50 between an upper layer 52 and a lower layer 54. The upper layer 52 and lower layer 54 may be formed of glass, metal or other suitable heat-resistant material. In an alternative embodiment, the heating coil 30, the protective cover or grate 34 and/or the smooth-top cook top 35 may be provided with a magnetic field source 40 and the cooking pot 12 the base 42 of the cooking pot 12 could be provided with or made from a magnetizable material.

Accordingly, a new and improved stove top safety feature comprising methods and devices for securing an item of cookware to a heating station of a stove top by use of a magnetic field.

While the present invention has been fully described above with particularity and detail in connection with what is presently deemed to be the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed is:

1. A method of securing a piece of cookware to a heating station having a cooking surface for placing the cookware thereon, comprising the following steps:
   providing a magnetic field source in the cookware;
   placing the cookware on the heating station; and
   wherein the magnetic filed source creates a magnetic field tending to bias the cookware against the cooking surface with sufficient force to prevent said cookware from being accidentally bumped off said cooking surface.

2. The method of claim 1 wherein both said cookware and said heating station are provided with a magnetic field source.

3. The method of claim 1 wherein said magnetic field source is a permanent magnet.

4. The method of claim 1 wherein said magnetic field source is an electromagnet.

5. The method of claim 1 wherein said heating station comprises a magnetizable material.

6. The method of the claim 1 wherein said cookware comprises a magnetizable material.

7. A cooking vessel for use on a cooking stove, comprising: a base and one or more walls extending upward from said base, said base having a bottom outer surface, a bottom inside surface and a magnetic field source disposed between said bottom outer surface and said bottom inside surface, said magnetic field source being strong enough to hold said cooking vessel against a cooking surface with sufficient force to prevent said cooking vessel from being accidentally bumped off said cooking surface.

8. The cooking vessel of claim 7 wherein said magnetic field source is a permanent magnet.

9. The cooking vessel of claim 7 wherein said magnetic field source is an electromagnet.

10. The cooking vessel of claim 7 wherein said walls, said bottom outer surface and said bottom inside surface are made of stainless steel.

11. The cooking vessel of claim 7 wherein said magnetic field source is adjustable such that strength of the magnetic field at the bottom outer surface may be adjusted to vary said strength and not merely turn the magnetic field on and off.

12. The cooking vessel of claim 11 wherein the adjustability comprises moving the magnetic filed source relative to said bottom outside surface.

13. A cooking stove, comprising:
   a cook top having at least one heating stations;
   said heating station comprising a heating element and a heating surface over said heating element for placing an item of cookware thereon;
   said heating surface comprising a magnetic field source for creating a magnetic field to create a force tending to bias an item of cookware against said heating surface, said magnetic field source is adjustable such that the strength of the magnetic field at the heating surface may be adjusted to vary said strength and not merely turn the magnetic field on and off.

14. The cooking stove of claim 13 wherein said magnetic field source is a permanent magnet.

15. The cooking stove of claim 13 wherein said magnetic field source is an electromagnet.

16. The cooking stove of claim 13 wherein the adjustability comprises moving the magnetic field source relative to said cooking surface.

* * * * *